United States Patent [19]

McPherson

[11] 4,236,290

[45] Dec. 2, 1980

[54] FAN PULLER

[76] Inventor: Billie J. McPherson, P.O. Box 597, Medina, Tenn. 38355

[21] Appl. No.: 15,734

[22] Filed: Feb. 27, 1979

[51] Int. Cl.$^3$ .................... B23P 19/04

[52] U.S. Cl. .................... 29/239

[58] Field of Search .................... 29/239

[56] References Cited

U.S. PATENT DOCUMENTS

| | | | |
|---|---|---|---|
| 1,398,269 | 11/1921 | Nelson | 29/239 |
| 3,680,838 | 8/1972 | Dunn | 29/267 |
| 4,001,927 | 1/1977 | Enderle | 29/239 |

*Primary Examiner*—James L. Jones, Jr.

*Attorney, Agent, or Firm*—Clarence A. O'Brien; Harvey B. Jacobson

[57] ABSTRACT

The fan puller is a special purpose tool utilized mainly for removing the fan element from the motor drive shaft of an air conditioning unit. The fan puller has a pair of hinged heads each of which includes a shaft receiving recess formed therein. These recesses are aligned so that the heads may be positioned over a motor shaft. The heads are attached to individual actuation arms which cause the heads to rotate about the hinged coupling thereby forcing one head against the motor body and the other head against one axial face of the fan hub to cause the fan to slide axially off the motor shaft.

1 Claim, 4 Drawing Figures

FAN PULLER

BACKGROUND OF THE INVENTION

1. Field of the Invention

This invention relates to fan and pulley removing devices generally.

2. Description of the Prior Art

Generally when servicing air conditioning or other refrigeration units, it is necessary to disassemble the unit to effect proper repair thereof. One of the major obstacles encountered in such disassembly is the removal of the fan from the fan motor drive shaft. A close fit of the fan hub to the shaft is required in order to insure proper operation of the fan and the motor combination when new. Over an extent of several years, dust, dirt, corrosion, etc., can cause this close fit to become a semi-permanent attachment. A substantial amount of force is required in order to separate the fan from the motor shaft.

No tool is presently known to exist which is designed specifically for effecting removal of a fan from a shaft. However, several prior art devices are known which may be used for effecting displacement of two objects. For instance, U.S. Pat. No. 290,277 issued Dec. 8, 1883 to Small shows a device for closing bricks. The device includes two levers joined together at a pivot point. The pivot point divides the device into a handle portion and a jaw portion. The handle portions of the levers are joined by a threaded screw member which can be turned for displacing the handles relative to one another for obtaining mechanical advantage in operation of the device. U.S. Pat. No. 717,526 issued Jan. 6, 1903 to Barney shows a pair of valve pliers which include a pair of jaws, each jaw being adapted to embrace the valve stem. Each jaw has a longitudinally concaved outer surface for engaging a valve packing nut in order to properly seat it upon the valve bonnet. U.S. Pat. No. 1,465,905, issued Aug. 21, 1923 to Hoff shows a tool for compressing valve springs. The Hoff tool includes a pair of laterally displaceable jaws. Each jaw is connected to a separate handle which handles are operative for causing displacement of the jaws. The jaws are connected in such a way that they are maintained in parallelism at all times. U.S. Pat. No. 1,155,28, issued Sept. 28, 1915 to Stark shows a horseshoe spreader having a pair of handle members, with shoe engaging portions formed on the handle members. Each of the handle members also has teeth formed thereon, which teeth interact with each other for providing a smooth closing action. U.S. Pat. No. 3,357,085, issued Dec. 12, 1967 to Martin shows a tool for removing wiper blades which includes a pair of pivoted levers having handles on one end and flat members on the other end. Each of the flat members has a cut-out portion for receiving the spindle of a windshield wiper mechanism. None of these references has been found to be useful in removing a fan from a shaft.

SUMMARY OF THE INVENTION

The present invention includes a pair of lever members, each of which includes a handle attached to a head. The levers are attached together by a pair of plates which extend between the two heads. One of the heads includes a cam lobe which extends from the head and makes contacts with a flattened surface of the other head. The two levers pivot about this cam for displacing the heads inward and outward with respect to one another. Each head has an outwardly curved configuration with a bifurcated tip forming a shaft surrounding slot. The slots of the two heads align with one another for allowing the heads to be disposed between the hub of a fan to be removed and a motor from which the fan mounting shaft extends. The hinge formed by the connecting plates allows for slight longitudinal movement in order to permit a slight misalignment of the heads in operation. A threaded shaft extends between the handles and passes through elongated slots formed therein. Each end of the shaft has mounted thereon a nut. The nuts can be moved along the shaft for providing a mechanical advantage for closing the levers together.

Accordingly, one object of the present invention is to provide a fan puller which is simple in construction yet durable and effective in use.

A further object of the present invention is to provide a fan puller which includes a pair of levers connected by a hinged joint which allows for slight longitudinal displacement of the levers with respect to each other.

A still further object of the present invention is to provide a fan puller which has a pair of heads which fit over the motor shaft and contact respectively the fan hub and the motor for forcing separation of the two.

An even still further object of the present invention is to provide a fan puller which includes a threaded bar extending between the levers for providing a means of gaining additional mechanical advantage.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
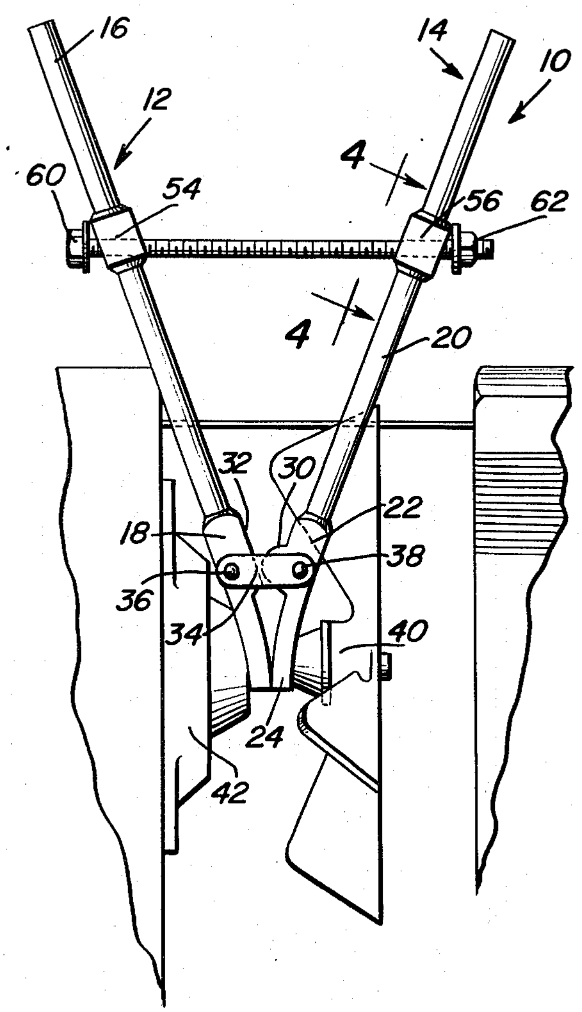
FIG. 1 is an elevational view of the fan puller in its operative position between a motor and fan hub.
Figure 2:
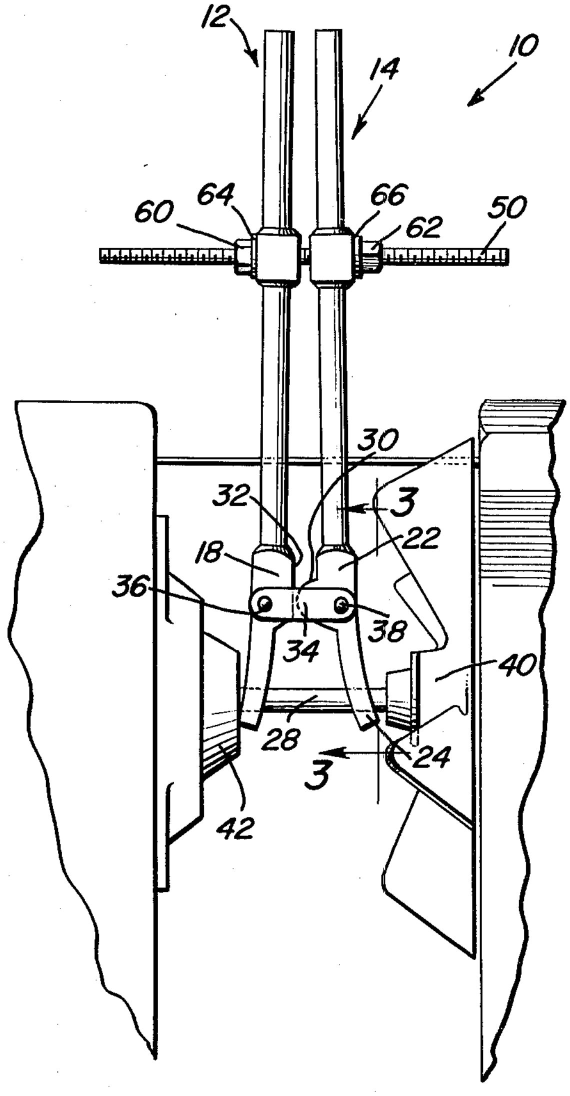
FIG. 2 is an elevational view of the fan puller showing its operative position after removing a fan from a shaft.
Figure 3:
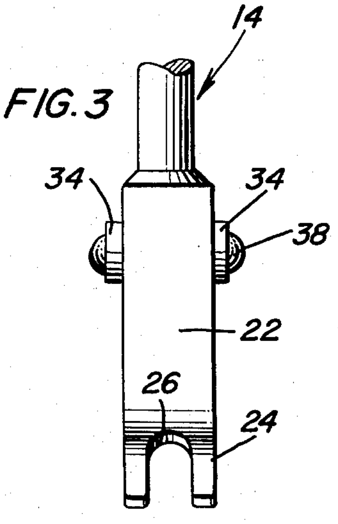
FIG. 3 is an elevational view taken substantially along a plane passing through section line 3—3 and showing one of the heads.
Figure 4:
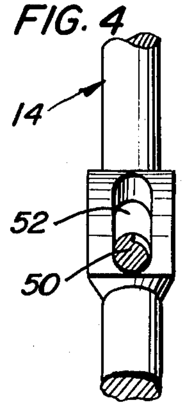
FIG. 4 is a sectional view taken substantially along a plane passing through section line 4—4 of FIG. 1.

Now, with reference to the drawings, the fan puller generally referred to by the numeral 10 will be described in detail. It can be seen that the fan puller comprises a pair of levers 12 and 14. Lever 12 includes handle portion 16 which is attached to head 18, while lever 14 includes handle 20 and head 22. Head 22 has a bifurcated tip 24 which forms slot 26, which slot is dimensioned to properly fit over motor shaft 28, which may have a diameter of up to 9/16 of an inch. Consequently, slot 26 would preferably be $\frac{5}{8}$ of an inch wide and $\frac{3}{4}$ of an inch deep. Head 22 also contains a cam lobe 30 which forms a portion of the hinge coupling connecting levers 12 and 14. Head 18 is identical to head 22 except that in place of lobe 30, head 18 has a planar lobe engaging surface 32. Lobe 30 rests on surface 32 and is held in contact therewith by connector plates 34. Each connector plate 34 has one end pivotally connected to head 18 by pin 36 while the opposite end of each plate 34 is pivotally attached to head 22 by pin 38. These connector plates and pins complete the hinge coupling between the levers. As is readily apparent from the drawings, the heads 18 and 22 each have a generally outwardly curved configuration such that the head tips are positioned in a diverging relationship. This diverging relationship, together with the distance maintained between the levers by virtue of cam 30 allows for a maximum angular displacement of the handles of levers 12 and 14 and also their respective heads. As seen in FIGS. 1 and 2, this allows for maximum movement of the fan element 40 with respect to the motor housing 42 when the heads are inserted between these elements as shown in FIG. 1 and the handles are moved together, as shown in FIG. 2. It should also be noted that by the use of connector plates 34, it is possible to allow for longitudinal displacement of the levers 12 and 14 with respect to one another. In this manner, the fan puller may be positioned at an angle with respect to shaft 28 and the bifurcated tips can still encompass the shaft. Or, the tips may be misaligned in order that one head can be forced against a stronger portion of the motor housing or fan hub.

In the event that manual force exerted on handles 14 and 16 is insufficient to move the fan 40, an additional mechanical advantage can be gained by the use of threaded bar 50 which passes through elongated slot 52 in the handle of levers 12 and 14. As shown in the drawings, these slots are contained in enlarged sections 54 and 56 of the levers 12 and 14. Threaded bar 50 passes through these slots and engages nuts 60 and 62 and washers 64 and 66, which are inserted between the respective nuts and levers 12 and 14. By simply turning the nuts 60 and 62, the additional force needed to remove a stuck fan, or a fan in which the fan set screw cannot be removed, can be obtained.

Furthermore, the fan puller can be used with channel-shaped spacers which can rest on the shaft 22 in order to accommodate distances between the motor housing and fan which are greater than the maximum extension of the heads 18 and 22. Spacers can be provided in various lengths in order to adapt the fan puller for use with any standard motor and fan configuration.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tool for exerting a force between two elements mounted on a common shaft, said tool comprising: a first lever having a handle portion and a head portion; a second lever having a handle portion and a head portion; and hinge means for hingedly connecting said first lever to said second lever in opposed, spaced relation allowing limited longitudinal movement of said first lever with respect to said second lever; said hinge means including at least one longitudinally extending connector plate which extends between and is pivotally mounted to each of said first and second levers and a cam lobe mounted on one of said first and second levers for contacting the other of said first and second levers, said cam lobe being positioned between the said pivotal mounts of said lontitudinally extending connector plate; further wherein each of said heads includes a bifurcated tip for contacting and partially surrounding said shaft, each of said bifurcated tips extending laterally of its respective lever, said bifurcated tips being thereby positioned in a mutually diverging relationship; and a mechanical advantage means extending between the handle portions of said levers for providing a mechanism for causing displacement of said levers, said mechanical advantage means including a threaded bar extending through each end of said handle portions and a complementary threaded nut attached to each end of said bar.

* * * * *